(12) United States Patent  (10) Patent No.: US 7,424,471 B2
Ross  (45) Date of Patent: Sep. 9, 2008

(54) SYSTEM FOR SEARCHING NETWORK ACCESSIBLE DATA SETS

(75) Inventor: Laurence Ross, Oldwick, NJ (US)

(73) Assignee: LSR Technologies, Oldwick, NJ (US)

( * ) Notice: Subject to any disclaimer, the term of this patent is extended or adjusted under 35 U.S.C. 154(b) by 0 days.

(21) Appl. No.: 11/620,847

(22) Filed: Jan. 8, 2007

(65) Prior Publication Data

US 2008/0168035 A1  Jul. 10, 2008

(51) Int. Cl.
G06F 7/00 (2006.01)
(52) U.S. Cl. .......................... 707/3; 707/101
(58) Field of Classification Search .................. 707/3, 707/5, 10
See application file for complete search history.

(56) References Cited

U.S. PATENT DOCUMENTS

| 5,157,783 | A | 10/1992 | Anderson et al. |
| 5,649,186 | A | 7/1997 | Ferguson |
| 5,715,443 | A | 2/1998 | Yanagihara et al. |
| 5,983,227 | A | 11/1999 | Nazem et al. |
| 6,185,614 | B1 | 2/2001 | Cuomo et al. |
| 6,336,116 | B1 * | 1/2002 | Brown et al. ............... 707/10 |
| 6,344,855 | B1 | 2/2002 | Fisher et al. |
| 6,633,867 | B1 | 10/2003 | Kraft et al. |
| 6,763,393 | B2 | 7/2004 | Hirosawa et al. |
| 6,834,276 | B1 | 12/2004 | Jensen et al. |
| 6,957,390 | B2 | 10/2005 | Tamir et al. |
| 7,058,726 | B1 * | 6/2006 | Osaku et al. ............... 709/245 |
| 7,076,484 | B2 | 7/2006 | Dworkis et al. |
| 7,080,070 | B1 | 7/2006 | Gavarini |
| 7,082,476 | B1 | 7/2006 | Cohen et al. |
| 7,120,862 | B1 * | 10/2006 | Ong ........................... 715/511 |
| 7,152,058 | B2 | 12/2006 | Shotton et al. |
| 7,177,818 | B2 | 2/2007 | Nair |
| 7,185,272 | B2 | 2/2007 | Pearce et al. |
| 7,197,508 | B1 | 3/2007 | Brown, III |
| 7,269,642 | B2 | 9/2007 | Mathews |
| 2002/0103806 | A1 * | 8/2002 | Yamanoue ................. 707/100 |
| 2002/0143895 | A1 | 10/2002 | Bengi et al. |

(Continued)

FOREIGN PATENT DOCUMENTS

EP  1006462  6/2000

(Continued)

OTHER PUBLICATIONS http://training.dialog.com/onlinecourses/trademarks/lesson6/tm6-02.html (Dialog Online Website).

*Primary Examiner*—Sathyanarayan Pannala
(74) *Attorney, Agent, or Firm*—Keith D. Nowak; Carter Ledyard & Millburn LLP

(57) ABSTRACT

The subject invention is a search software module that allows the user to create custom searches of theoretically any network accessible data set and to save and associate those searches with a unique Identifier for easy reference. The results of a saved search are referenced via the unique Identifier which can be accessed from or integrated with multiple network-connected user interface channels (desktop shortcut, e-mail, contact manager field, web portal, mobile device, etc.) that can provide additional context or convenience in reviewing the results. The custom search is automatically updated with a single click and the results presented will be the most recent and relevant for the custom search criteria that the user has selected.

1 Claim, 11 Drawing Sheets

U.S. PATENT DOCUMENTS

| | | |
|---|---|---|
| 2003/0055914 A1 | 3/2003 | Tanaka |
| 2003/0080993 A1 | 5/2003 | Baker |
| 2004/0210828 A1 | 10/2004 | Langer |
| 2004/0220893 A1 | 11/2004 | Spivack et al. |
| 2005/0172007 A1 | 8/2005 | Avrahami et al. |
| 2005/0182828 A1 | 8/2005 | Lamkin et al. |
| 2006/0206469 A1* | 9/2006 | Brown et al. .................... 707/3 |
| 2006/0224938 A1* | 10/2006 | Fikes et al. ................. 715/500 |

FOREIGN PATENT DOCUMENTS

EP    1006463    6/2000

* cited by examiner

Steps 2,3,4) when the user chooses "Save Target As," the Handler searches for the unique identifier and directs the script "sflist2.htm" to a folder designated by the user FIG. 4c
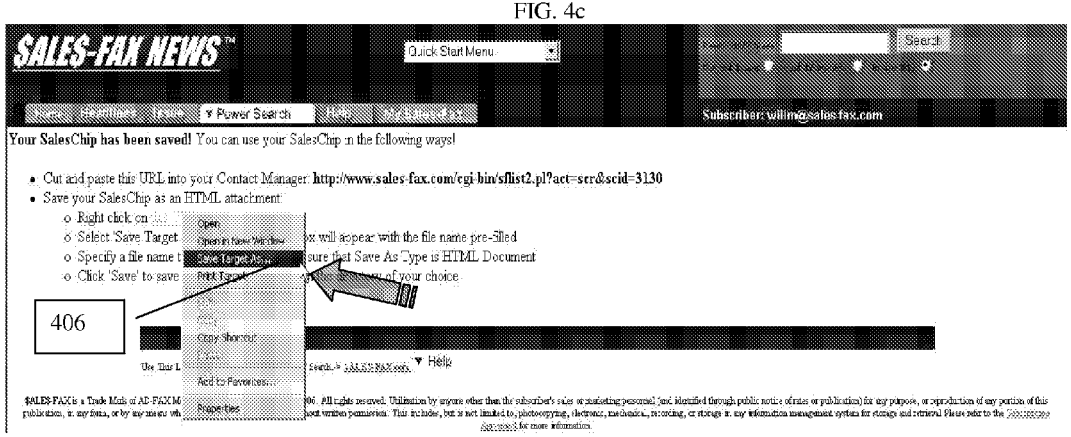
Fig 4d
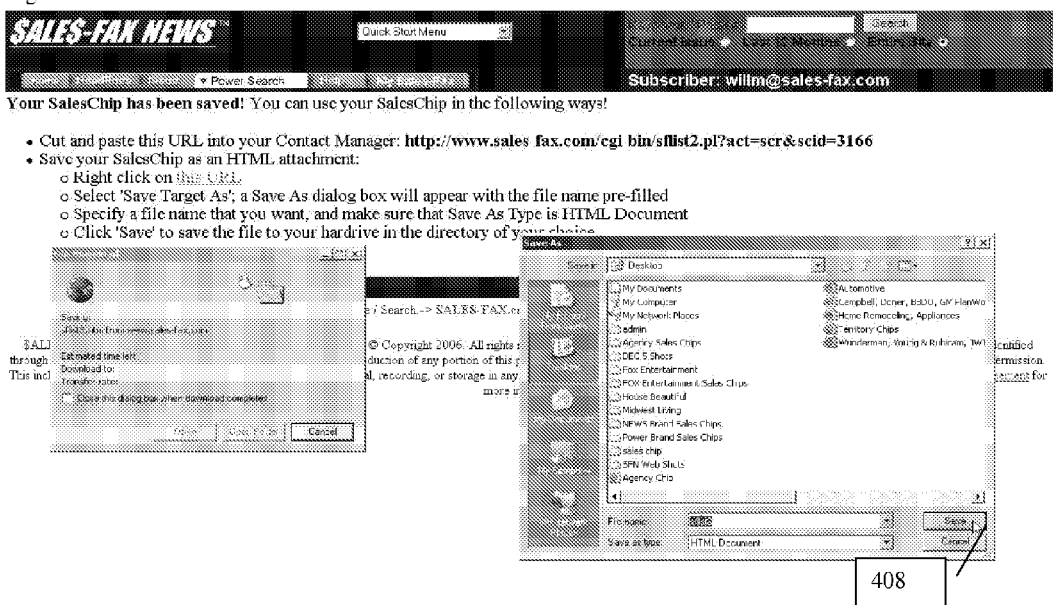
FIG. 4d FIG. 4e
FIG. 4f
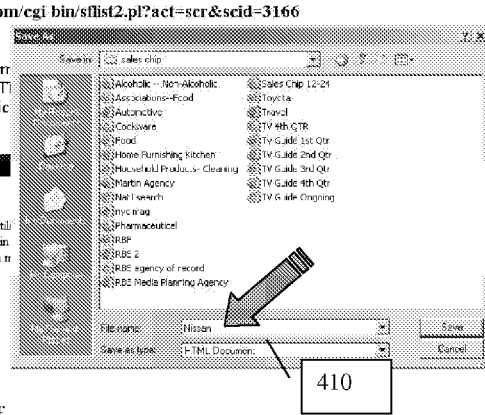
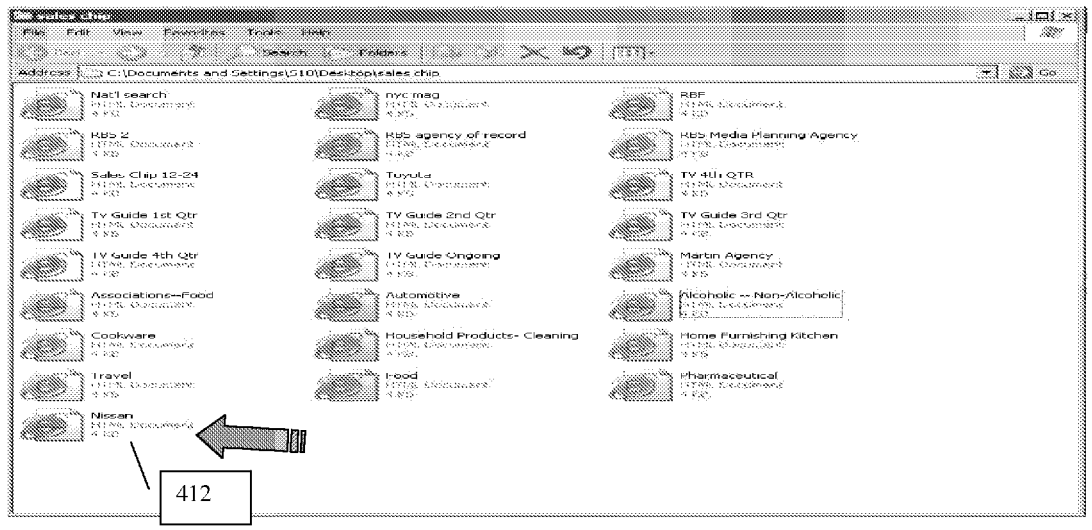

FIG. 5c
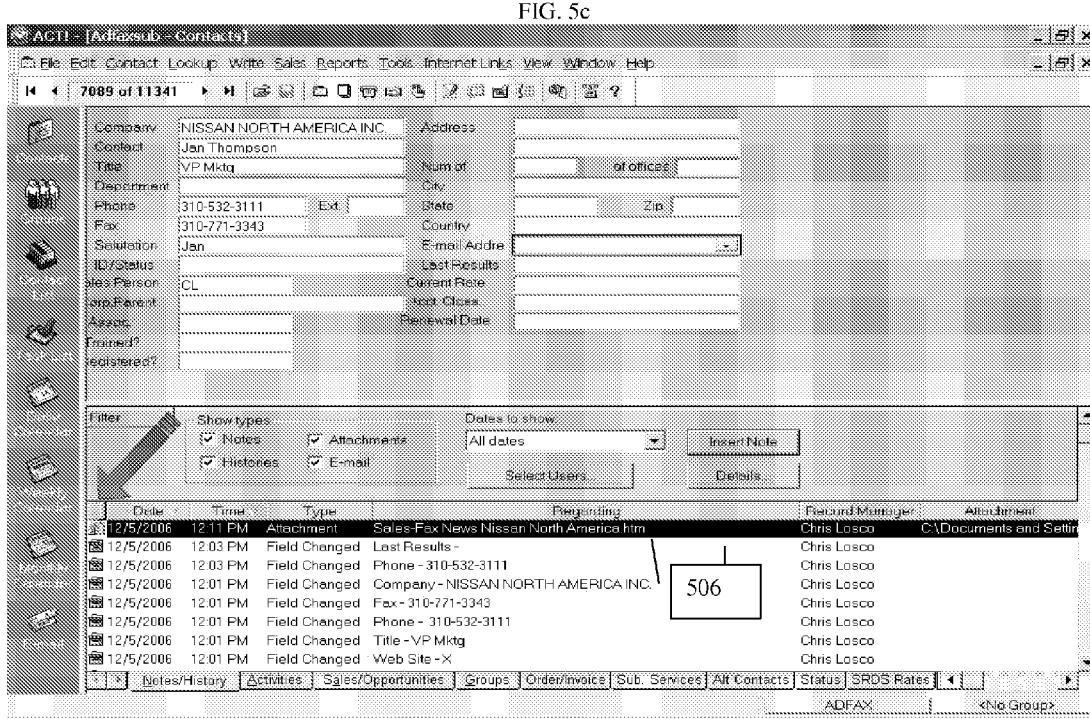
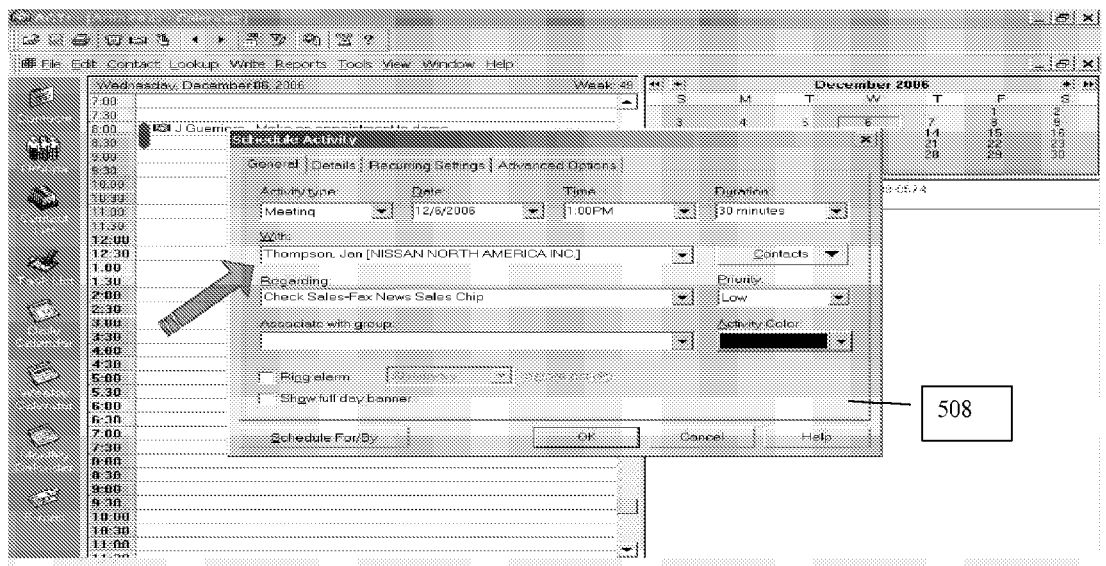
FIG. 5d

FIG. 6

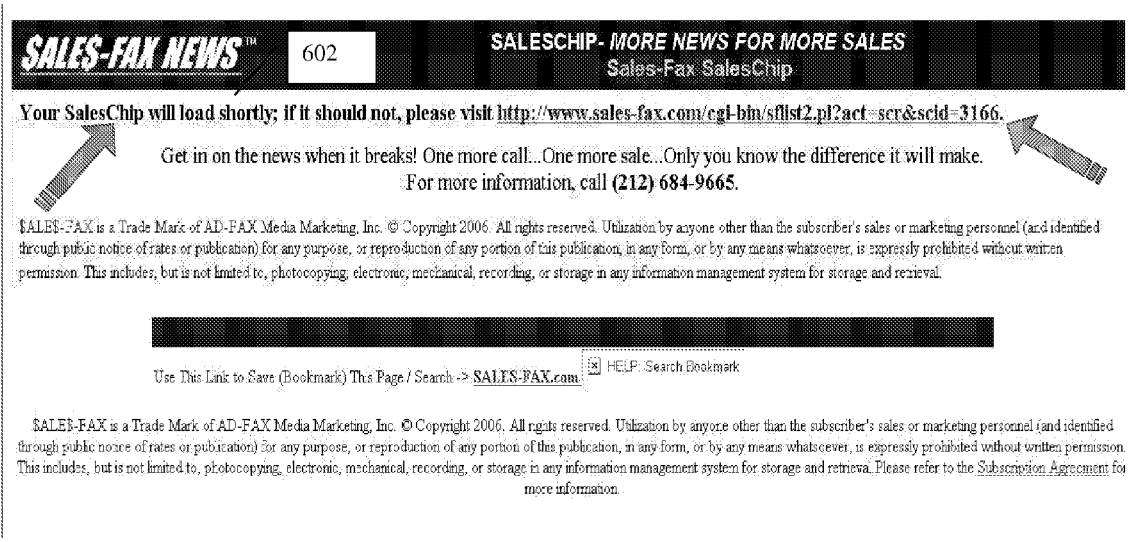

FIG. 7

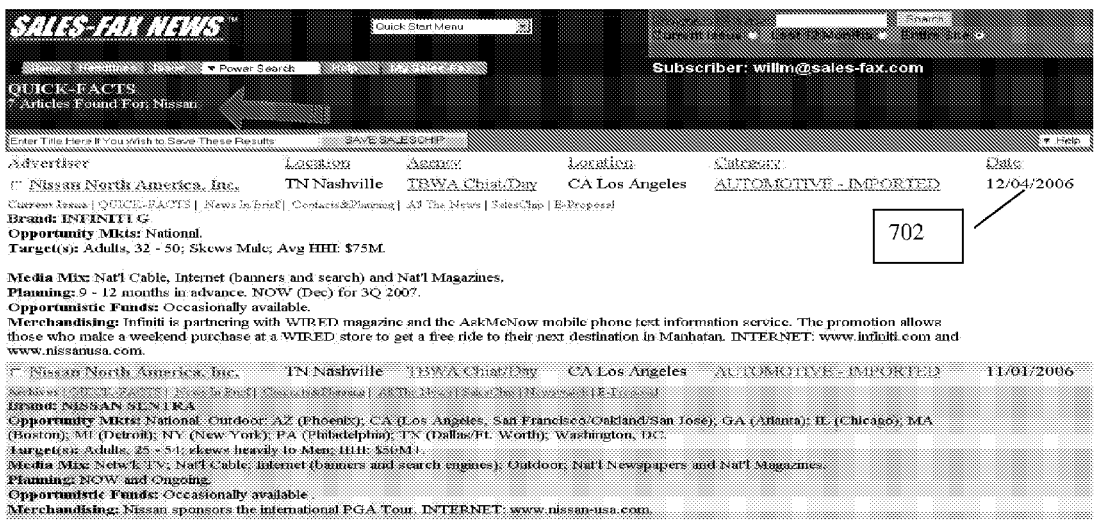

Note: The critical difference between a saved book mark and a Sales-Chip is the ability of Sales-Chip completely refresh itself. I.e. A bookmark saved via target link returns o the date on which it was saved. Sales-Chip can re-run the saved query in the moment it is cicked to activate from any Web-friendly field. Bookmarks cannot deliver fresh results outside of the browser. If saved to a file,

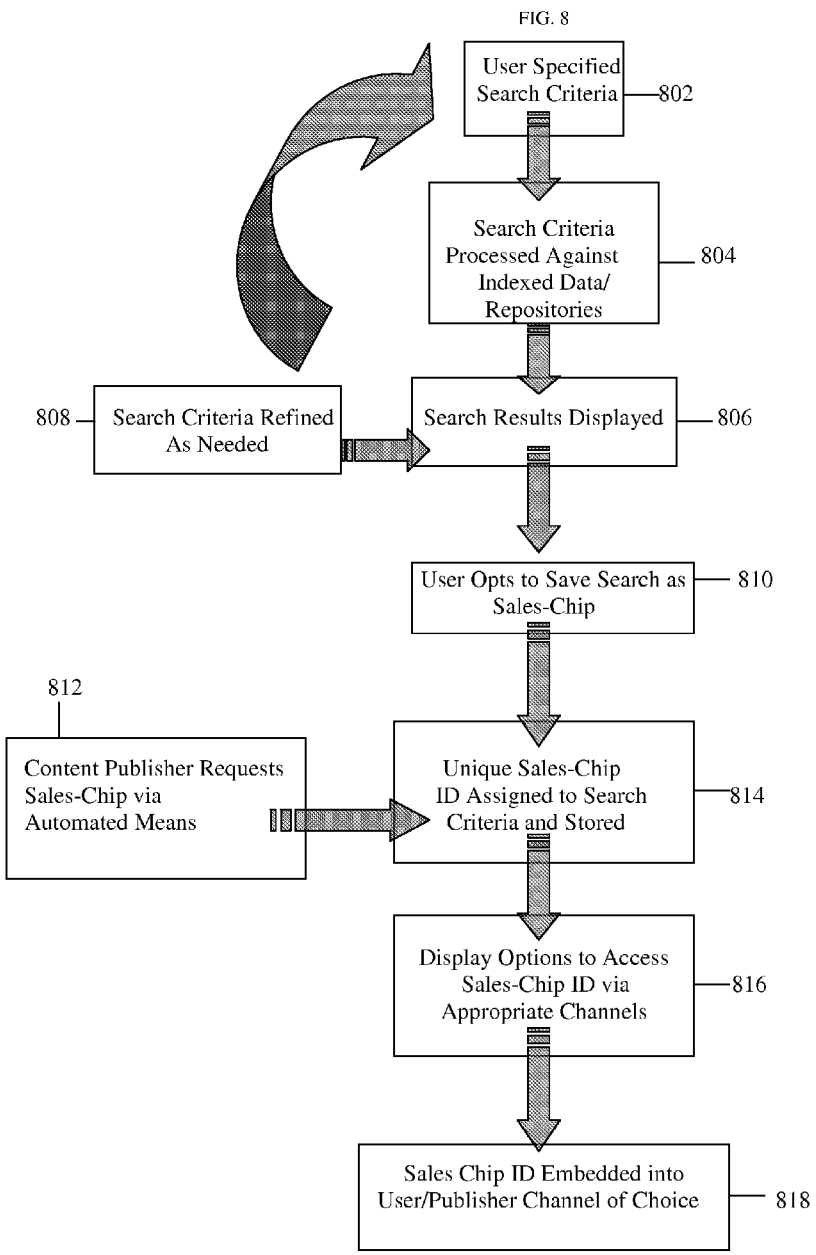

SYSTEM FOR SEARCHING NETWORK ACCESSIBLE DATA SETS

BACKGROUND OF THE INVENTION

U.S. Patent Publication No. 2005/0182828 entitled "Platform Specific Execution" discloses a media interface for use in a readable medium playback device (that) enables synchronization of disparate media playback, network directed playback of media, media playback control via displayed html/JavaScript file, logging of consumer identifier, media identifier, and playback identifier in a cookie or log file.

In this invention, cookie manager records the information for later reading including the tracking of consumer identifier, playback device identifier, and reader identifier triples. Significantly, the cookie records information in answer to a question, and "triples" the mechanism for specified action. A cookie is information that a web site (server side program) puts on a client's computer or permanent storage so that information is retained from browsing session to browsing session (or later use in the same session). Typically, a cookie records user-specific information such as past user choices during interaction with the site. Cookies are useful because the nature of the hypertext transfer protocol (HTTP) used by the World Wide Web (WWW) is that each web page request is completely independent of all other requests. Thus, a cookie is a mechanism which allows a web site to retain access to past interaction history with particular clients. The subject invention does not employ "cookies" because it: 1) does not record interaction history; 2) does not plant itself on a user's PC or other internet connected device; and 3) does not record questions or queries without the knowledge or approval of the user.

As for the "bookmark manager" in U.S. Patent Publication No. 2005/0182828, a bookmark records the necessary information to return to the same point in a video playback of a video by recording the title number, time position, chapter, angle, sub picture and language. Bookmarks maintain the state of the player by storing general parameter registers (GPRMs) for a specific title. Significantly, video bookmarks mark the last video state. The present invention, unlike conventional bookmarks, does not rely on programming that returns to a "state" or page on a web site which was last visited or marked. The present invention re-runs the query to get to a site and place most likely to produce answers which most closely match the answers originally sought by the query made previously. Therefore, an advantage of the invention is that no additional memory is required to store previous search results and that a user can immediately see any change in the results which may have occurred since the previous search.

U.S. Pat. No. 5,983,227 entitled "Dynamic Page Generator" discloses a custom page server with user preferences organized into templates stored in compact data structures and the live data used to fill the templates stored local to the page server which is handling user requests for custom pages. One process is executed on the page server for every request. The process provides a user template for the user making the request, where the user template is either generated from user preferences or retrieved from a cache of recently used user templates. Each user process is provided access to a large region of shared memory which contains all of the live data needed to fill any user template. Typically, the pages served are news pages, giving the user a custom selection of stock quotes, news headlines, sports scores, weather, and the like. With the live data stored in a local, shared memory, any custom page can be built within the page server, eliminating the need to make requests from other servers for portions of the live data. While the shared memory might include RAM (random access memory) and disk storage, in many computer systems, it is faster to store all live data in RAM.

U.S. Pat. No. 5,983,227 is intended to help the web user create a "page" or template for seeing content of interest (most likely dynamic content) in a format most pleasing or practical for the user. Importantly, user preferences are broad, but not necessarily within the total control of the user, as in the use of defaults which include information based on the location, demographics or presumed tolerances of the user. The subject invention is not intended to deliver a specific graphic interface, and does not depend on presets or predefined preferences, which is an advantage not shown in any of the individual references nor in any combination of the references.

The objective of U.S. Pat. No. 5,983,227 is speedy delivery of content of interest which depends on two things: 1) easily customized templates by the user; and 2) storage of the desired content, even with the objective of delivering it in real time. First, the present invention is not a template, and preferences are incidental to how the content of interest is viewed. Secondly, the objective of the present invention is to store the query as efficiently as possible, which precludes the need to store results.

U.S. Pat. No. 6,957,390 entitled "Method and Apparatus for Providing Dynamic Information to a User via a Visual Display" discloses a client-server system for recording web site activity by web users and dynamically customizing web display apparatuses for optimal information presentation based on the users' prior activity history. The system assigns each user a user identifier that allows the system to track the user's web sessions. The system also assigns every web site an application identifier that allows the system to track the user's activities at a particular web site. The system then records the user's activities as they visit different web sites via the user and application identifiers. The system determines how the user prefers to view each web site based on prior activity, their preferences, the web site, and various other factors. As the user surfs from web site to web site, the system dynamically configures the user's web browser and the web page information for optimum presentation based on how the user prefers to view the web site.

U.S. Pat. No. 6,957,390 is intended to deliver optimized views of web page(s), in configurations ("visual displays") that the user's history suggests he prefers. The presentation is based on the user's prior activity and preferences. The present invention is a search engine that refreshes its queries based on demand, either at will by pressing a button (link) or via possible presets—not based on the user's history of activities.

Although the intent of U.S. Pat. No. 6,957,390 is to return to sites or information that the user may want to visit more than once, the methodology for accomplishing this is vastly different than that of the present invention. The system of U.S. Pat. No. 6,957,390 starts with "The user install(ing) a web display application for each web site they want the server system to track and customize." The present invention starts when the user determines that search results are satisfactory, and then presses a Regenerating Search Engine (RSE) button to record the query for conversion into its own search engine. Therefore, a unique feature of the present invention is that the user is in complete control at all times.

U.S. Patent Publication No. 2004/0220893 entitled "User Interface for Managing Semantic Objects" discloses a comprehensive system for augmenting computer-mediated collaboration and communication of knowledge and information, using the concept of "semcards," that can be interconnected via a particular type of semcard that functions as a semantic link, to form distributed knowledge networks.

A semcard is a semantic software object that contains slots with semantic tags, and content, all of which can be represented semantically, optionally using ontology, and rules embodying optional rules regarding automation, goals, display, access permissions and other policies, sharing, and other operations of the semcard and its referent. The target is what the semcard is all about: it is an entity or concept that the semcard represents or describes and holds metadata about. It can be a physical entity such as a living person, a software entity such as a data record or word processing document, or an intangible entity such as an idea or feeling. Further, any type of digital object or information can be attached to a semcard, e.g. a digital certificate, a link to a web or a product or service offer, an SKU, a data record in a database, or knowledge item, software, or a file or media object, media streams, a link to remote Web service, etc. Semcards can also be used themselves to represent the relationship between other semcards, for example, that the person is the author of the idea. Physically, a semcard can be thought of as a form with fields or slots, and has two incarnations, template and instance, which correspond roughly to the object-oriented program concepts of object template and object instance.

Significantly, all examples of semcard application involve the creation of tables or fields for matching information in one set to one or more others for the purpose of sharing or exchanging content of interest. They are also used to create tables of product hierarchies and note preferences that can be used digitally to perform tasks.

Although semcards are capable of cataloguing queries for future use, it would appear from the patent holder's description, doing it with a semcard is very different than in the present invention. First, whether it was done in advance, during, or after the query, a semcard must be "drafted." Then, information must be entered into a "slot" or "field" and compared or matched with other data for an event (such as search or sharing with others who work on the same project) to occur.

In contrast, the subject invention saves the query of a "successful" search in a configuration that converts it to a script that allows it to function as a search engine that refreshes itself—with just one click of the mouse. Only the reconfigured query is stored in a web-friendly database structure on a server. Thus, it may be copied as a script to a web-friendly field, or saved via a target link for storage on a hard drive in any file that interfaces with the internet (or, potentially, any relational files). First, with the present invention the user simply presses a button to save a search, and then chooses whether he wants to copy and paste it to a web-friendly field, or save it as a target link where it can be stored in a file for later use as an attachment to an e-mail or other web-based communication system. Finally, when it comes to reuse, the user merely has to click a URL to re-run the saved search. Clearly, the user did not have to create a semcard to save or activate a search.

U.S. Patent Publication No. 2003/0055914 entitled "Communication Apparatus and Method, Recording Medium, Program and Content Providing Apparatus" discloses a content providing system having a terminal and a server. The terminal includes a selector for selecting search information from information presented to a user; a search information transmitter for transmitting the search information selected by the selecting means to the server; and a content data receiver for receiving content data corresponding to the search information supplied from a Handler. The server includes a storage device for storing the content data corresponding to the search information; a searcher for searching the storage means for the content data corresponding to the search information supplied from the search information transmitter; and a content data transmitter for transmitting the content data received from the storage information to the terminal.

U.S. Patent Publication No. 2003/0055914 addresses a different objective than the present invention, which is aggregating unlinked web sites, so that they are available via one search. According to U.S. Patent Publication No. 2003/0055914, when a user reaches a web site and wants to obtain access to another site referred to on the first site that is not linked, the user must again access the search engine. The keyword for the other desired content must be re-entered to go to the site holding that content. The search engine site must be accessed every time the user desires content, which takes time and labor. The objective of the subject invention is to save searches for information—whether the results contain links or not—to re-run queries quickly and conveniently in a broad array of web-friendly environments. It is not necessary to reenter a search team to renew a search. Rather, the subject invention records and edits a query to rerun a search on demand and the query can be stored in two different modes neither of which requires any hardware beyond a PC connected to the Internet.

U.S. Patent Publication No. 2002/0143895 entitled "Method for Generating a Presentation for Re-locating an Information Page That Has Already Been Called" discloses a method to generate a "presentation" for re-locating an information page that was already called from a home page of an information vendor. The home page can be called via the Internet, an intranet or an extranet. A displayable presentation is generated from which the called information pages of the information vendor can be recognized.

U.S. Patent Publication No. 2002/0143895 addresses a different objective than the present invention which is: retracing the steps to return to a web site after the user has left the site, and presumably gone to other sites or locations where it is impossible to back arrow to the original site. The present invention, on the other hand, is saved at the time the successful search was made, obviating the need to communicate what steps need to be re-traced.

U.S. Pat. No. 6,834,276 entitled "Database System and Method for Data Acquisition and Perusal" discloses a database selection module, which enables selection of a plurality of files, objects, or documents for inclusion into at least one selectable database. Also disclosed is a link module, which enables custom links to be defined between selected terms of selected files of the selectable database; a database index generator module, which enables generation of a searchable index of the data contained in the selectable database; and a search module that enables a search to be performed of the searchable index according to a search criterion.

U.S. Pat. No. 6,834,276 addresses different objectives than the subject invention, namely the generation of searchable indexes for the purpose of linking files for a wide variety of information-driven tasks, as well as to store results from various sources including the internet with internet formats files, objects or documents.

The purpose of the present invention is to empower the user to create custom searches of theoretically any network accessible data set and to save and associate those searches with a unique identifier for easy reference. The results presented via the inventive search method is intended to be the most recent and relevant for the custom search criteria that the user has selected, versus linking or sorting files for other applications, as in U.S. Pat. No. 6,834,276.

U.S. Pat. No. 6,344,855 entitled "Encapsulated Network Entity Reference of a Network Component System for Integrating Object Oriented Software Components" discloses a network-oriented component system that efficiently accesses information from a network resource located on a computer network by creating an encapsulated network identity that contains references to that resource. The encapsulated entity is preferably implemented as a network component stored on a computer remotely displaced from the referenced resource. In addition, the encapsulated entity may be manifested as a visual object on a graphical user interface of a computer screen. Such visual manifestation allows a user to easily manipulate the entity in order to display the contents of the resource on the screen, or to electronically forward the entity over the network.

U.S. Pat. No. 6,344,855 requires an "encapsulation" that includes a "pointer," such as a URL, that identifies the network address of that resource, e.g. a Web page. In addition to storing the pointer, the encapsulated entity also contains information for involving appropriate network components needed to access the resource.

In the present invention, however, nothing is hidden or "encapsulated." The script that runs the query, and re-runs it when the link is clicked, is in plain sight. When a search is saved as a target link, the HTML file has a name in script. Like any file on any operating system it can be re-named by the user for more convenient reference. No object has to be created to hide all or part of the process that produces a search or its functions. The results of a saved search are referenced via a unique identifier. They can be accessed from or integrated with multiple network-connected user interface channels (desktop shortcut, e-mail, contact manager field, web portal, mobile device, etc.) to provide additional context or conveyance in reviewing the results. As stated above, the script that make this possible is always in full view, and usable as expressed in HTML. However, it is important to note that the invention is not limited to the use of HTML, but can be implemented using other programming languages as described in greater detail below.

U.S. Pat. No. 6,185,614 entitled "Method and System for Collecting User Profile Information over the WWW in the Presence of Dynamic Content Using Comparators" discloses a method and system for collecting profile information about users accessing dynamically generated content from one or more servers.

A server dynamically generates a web page in response to a user request. The server customizes the web page content based on the requested universal resource identifier (URI) and one or more of:
  The user's identity;
  Access permissions;
  Demographic information;
  Previous behavior at the site.

The web server then passes the URI, user identity, and dynamically generated web page to an access information collector. The access information collector then generates document comparators from the current web page content and compares them to document comparators associated with previously retrieved web pages. If the current web page is sufficiently similar to some previously retrieved web page, the access information collector logs the URI, user identity, and a document key associated with the matching previously retrieved page. Otherwise, the access information collector generates a new key; stores the new key and the document comparators in a database; and logs the URI, user identity, and the newly generated document key.

The only similarity that U.S. Pat. No. 6,185,614 and the subject invention share is the use of an identifier to retrieve content of interest. However, the subject invention does not use comparators to establish identifiers. On determining that the results of a request are satisfactory, the user clicks "Save" to initiate the process of assigning a unique identifier to the query—not the content. Further, the identifier is simply a number assigned by widely available technology. No elaborate comparator is necessary.

U.S. Pat. No. 5,649,186 entitled "System and Method for Computer-Based Dynamic Information Clipping Service" discloses a system and computer-based method providing a dynamic clipping service comprising the following steps:
  An end user creates a template of topics of interest via a graphical interface;
  The template is transmitted to a central site;
  Information relating to a particular base of knowledge is collected;
  Parsed and indexed;
  The parsed and indexed information is stored in an information repository;
  The template is processed by parsing and collecting command-strings relating to topics of interest found within the parsed template;
  The information repository is searched using the collected command-strings to generate query results;
  The results are sorted;
  An HTML page is created using the sorted query results;
  The page is then made available to the end user for viewing, wherein the page represents a custom network-based newspaper.

U.S. Pat. No. 5,649,186 is designed to enable computer networks to "read" contents of interest, and dynamically convert pages of requested content into a format that is similar to a newspaper. In essence, this invention is an automatic clipping service.

In contrast, the subject invention does not use an "infobot" to find content of interest, and a template to be processed so that the "command string" may be generated and reside in a "master topic file" for information retrieval at a later date. Further, parsing is unnecessary because each saved search is stored as a unique identifier that does not require further processing as mentioned above. If the search was saved, it was deemed appropriate by the user who saved it.

U.S. Patent Publication No. 2003/0080993 entitled "Dynamically Autoconfigured Feature Browser for a Communication Terminal" discloses a feature browser display in a communication system terminal controlled in accordance with user-specific feature utilization history information. The utilization history information may include, e.g. a set of utilization counters for each of a number of features supported by the system, and the presentation order may be determined by sorting the utilization values of the corresponding features in an increasing or decreasing order. The utilization counters may be stored in a feature presentation management table that is implemented in the terminal and includes:
  A feature identifier;
  A presentation order number;
  A utilization counter for each of the features.

In a state-based embodiment, a different feature presentation management table is maintained for each set of designated terminal states, such as on hook, off hook, and active (e.g. the phone, "reset," "re-dial," "on-hold," "conference call," "auto-dial," etc.). The feature browser utilizes the feature presentation management table(s) to determine the user-specific order in which features are to be presented on the terminal display;

U.S. Patent Publication No. 2003/0080993 is based on the premise that cell phones have limited display space and require a lot of scrolling and toggling to get to the features a user wants to use most. The feature browser display simultaneously displays identifiers of multiple features, and a particular one of the features determines presentation order. "Identifiers" use short descriptions or symbols of the features to make the most of limited display space.

In contrast, the present invention retrieves search commands so that they do not need to be rebuilt to rerun a new query. Identifiers, in this case, stem from the results of a saved search that are referenced via a unique identifier which can be accessed from or integrated with multiple network-connected user interface channels (desktop shortcut, e-mail, contact manager field, web portal, mobile device, etc.) that can provide additional context or convenience in reviewing the search results. The identifier of the subject invention is an Internet URL that is uniquely associated with the search criteria via an ID number.

SUMMARY OF THE INVENTION

The subject invention provides for the creation of personalized search requests across a broad array of search sources and user interface platforms, permitting a novel search technique that is extremely easy to use, fast and efficient and unique in the benefits it provides to a user.

The subject invention includes the creation of an Identifier that serves as a single, convenient and portable reference to custom search criteria which the user has specified and saved. The Identifier is implemented as a number which is passed as a reference in a URL and also includes reference to a Handler application whereby accessing the URL will display the search results. The URL can be accessed from and integrated with multiple user channels connected to the Internet to permit execution of the URL and display of the search results.

The format of the Identifier is flexible and can take the form of alphanumeric or binary representations as long as that representation is unique and can be processed via a Handler application that is accessible to the user. This concept applies to any platform where a unique Identifier can be associated with a network-attached data set.

While the Identifier establishes a relationship with a search and associated data set, it can also control other aspects of the user experience which can be dictated by the user at the time of search creation. Presentation options can be specified by the user, such as a template to use in displaying the information. These presentation options can refer to almost any facet of the presentation. Options might include the results themselves (in terms of sort order or varying levels of detailed views) or the aesthetics of how the information is displayed in terms of color scheme or graphical layout.

The Identifier could also be used to uniquely identify a user in conjunction with a data set. User identification is accomplished via the presence of a cookie on the user's browser which authorizes the display of the results.

The results of saved searches may currently be accessed via a variety of means such as:
  A repository of all of the user's saved searches may be accessed via a custom profile page on a web site;
  The URL of an individual search can be cut and pasted onto any vehicle that supports a URL, such as a desktop shortcut or contact manager;
  An individual search can be saved as an HTML file to the user's desktop; opening this HTML file on the user desktop will, via JavaScript, re-direct the user to the URL so the user can view the search result.

The reference implementation has been built using the Perl and JavaScript programming languages, however, the concept is not limited to a specific development language. The only development and operational limitations are the limitations represented by the specific web and/or user interface platform available to the user. For example, it might not be possible to permit the saving of an HTML file to a mobile phone, but the concept could be adapted to using an interface technique that matches that operating environment. In such a context, the present invention might be represented as an SMS ID that was stored in the user's address book.

BRIEF DESCRIPTION OF THE DRAWINGS

FIG. 4c is a sixth screen shot of the graphical user interface of the subject invention;

FIG. 4d is a seventh screen shot of the graphical user interface of the subject invention;

FIG. 4e is an eighth screen shot of the graphical user interface of the subject invention;

FIG. 4f is a ninth screen shot of the graphical user interface of the subject invention;

FIG. 5c is a twelfth screen shot of the graphical user interface of the subject invention;

FIG. 5d is a thirteenth screen shot of the graphical user interface of the subject invention;

FIG. 6 is a fourteenth screen shot of the graphical user interface of the subject invention;

FIG. 7 is a fifteenth screen shot of the graphical user interface of the subject invention;

FIG. 8 is a flow chart of the logic process of the subject invention; and

These and other subjects, features and advantages of the present invention will become more apparent in light of the following detailed description of a best mode embodiment thereof, as illustrated in the accompanying Drawings.

DETAILED DESCRIPTION OF THE PREFERRED EMBODIMENTS

The inventive system for searching network accessible data is referred to herein by the trade name "SalesChip" and is integrated in one non-limiting embodiment via the on-line publication "$ALE$-FAX NEWS." The present invention is a command-string which saves a query in a database, and subsequently allows the query to be reactivated with the help of a Handler. The Handler conducts a search for a unique Identifier, and forwards the results (the saved query) to a URL with instructions that tell a server to re-run the query.

Figure 1:
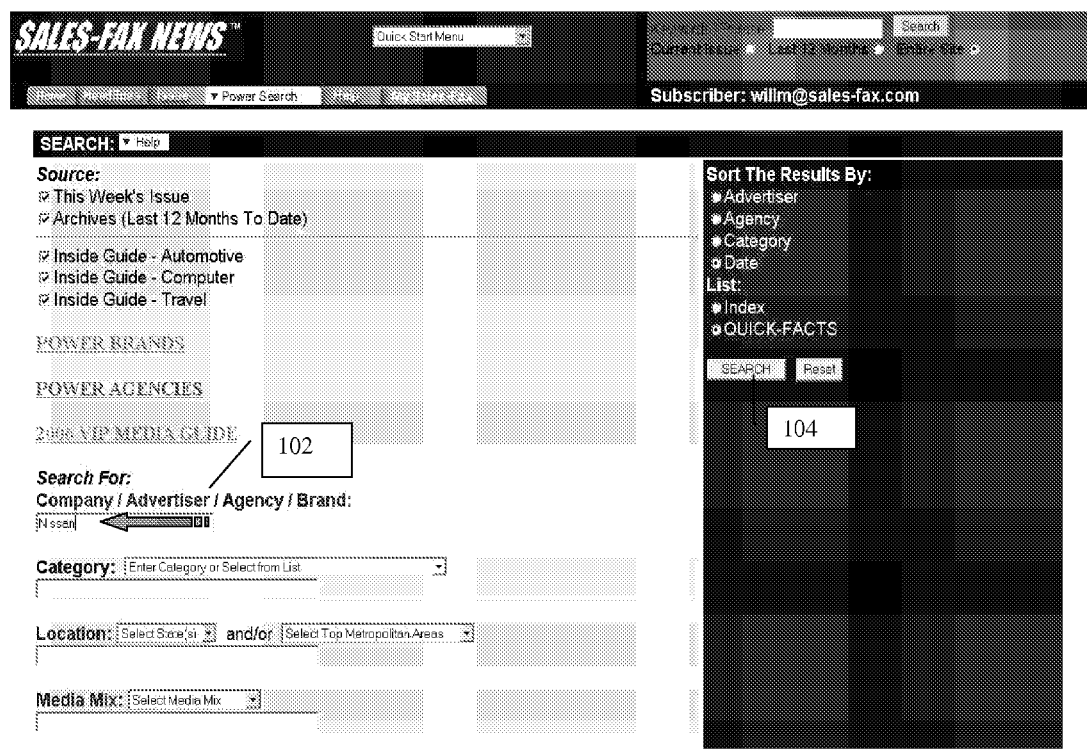
FIG. 1 is a first screen shot of the graphical user interface of the subject invention.
Figure 2:
FIG. 2 is a second screen shot of the graphical user interface of the subject invention.
Figure 3:
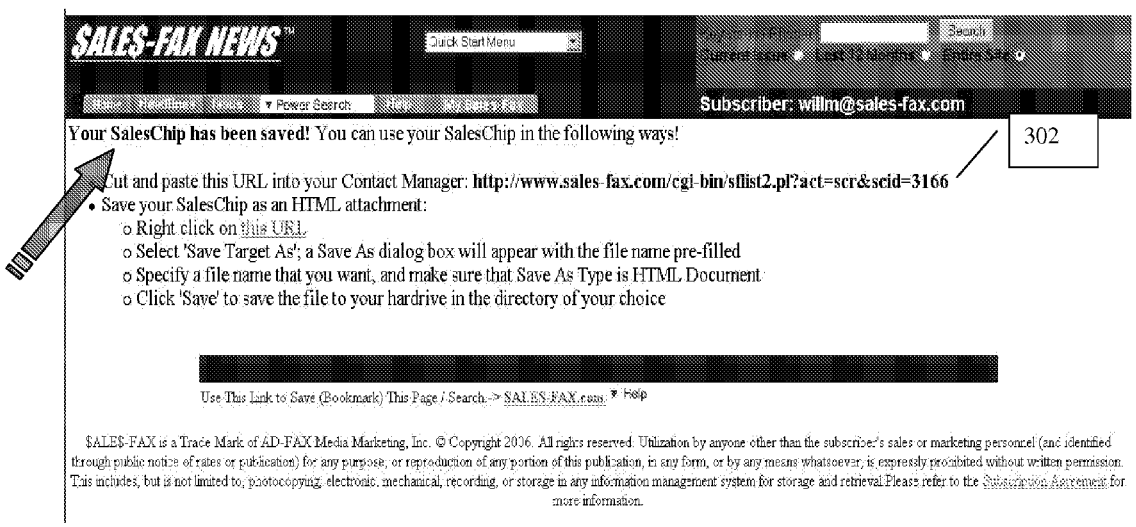
FIG. 3 is a third screen shot of the graphical user interface of the subject invention.

Referring now to FIG. 1, the process begins with entering a query into a search engine. The example shown in FIG. 1 is a query for "Nissan" entered in the "Parent/Company" search box 102 and using Search Button 104 to search. If the results of the search are satisfactory, the search is saved. FIG. 2 shows the results of searching for any news about Nissan published by $ALE$-FAX NEWS. The UI (User Interface) in this embodiment is a button labeled "Save SalesChip" which is shown in FIG. 2 as the Save SalesChip button 202. The term "SalesChip" is the term used for the inventive embodiment shown in the drawings. However, it is to be understood that the generic term for this function is a Regenerating Search Engine (RSE), which is used interchangeably with "SalesChip" herein. Activating the "Save SalesChip" button allows the user to send a command string, which produced the desired search result, to a database where it is given a unique Identifier 302 (FIG. 3). In this embodiment, the unique identifier is numeric, but it could be any binary system of characters.

Figure 4A:
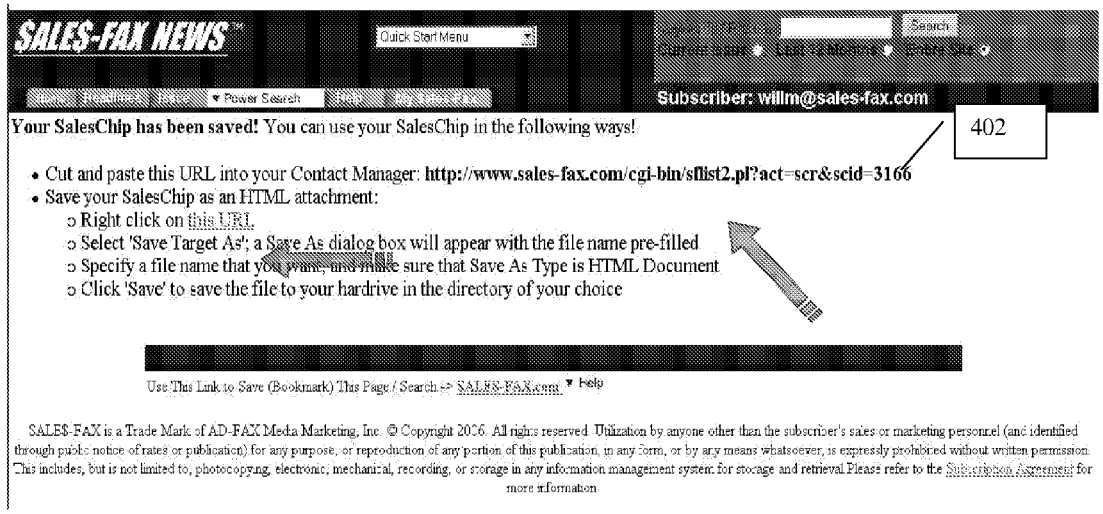
FIG. 4a is a fourth screen shot of the graphical user interface of the subject invention.

To make the query accessible in any web-friendly environment, a Handler application presents the user with two formats. First, as a command string with the unique Identifier specified at the end (in this example, the query for "Nissan" ends in 3166), which may be copied to a web-friendly field. As shown in FIG. 4a the command string 402 has Nissan's unique identifier "3166" at the end. Second, if saved as a "target link," it may be saved in an HTML format to file via the following steps at 404 of FIG. 4b.

Figure 4B:
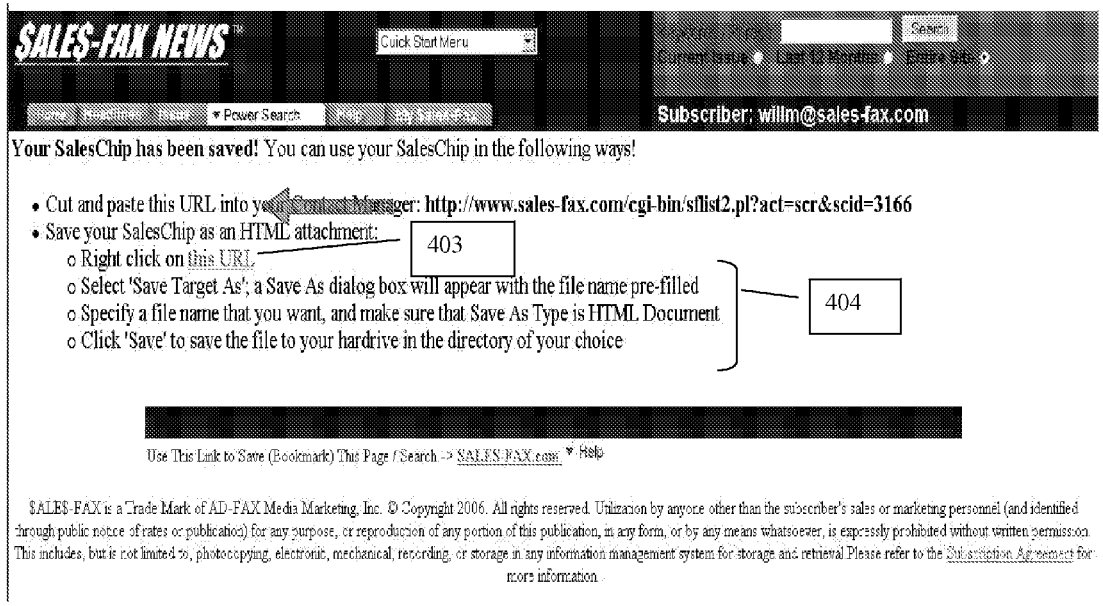
FIG. 4b is a fifth screen shot of the graphical user interface of the subject invention.

First, right click target file (FIG. 4b shows the target link 403 in underlined, blue type). When the user chooses "Target Link," the Handler searches for the unique identifier and directs the script "sflist2.htm" to a folder designated by the user. FIG. 4c and FIG. 4d shows the process by which the saved query with the unique identifier moves the link to a folder for storage as an HTML file at 406 and 408. The user gives the file a convenient name, in this case, "Nissan" and FIG. 4e shows the file with the name "Nissan" at 410. The user then saves the renamed file with an HTML extension and FIG. 4d shows how the Save button 408 is utilized to add the new query to the folder as an HTML file. The SalesChip/RSE now resides in the designated folder for future use in the folder, or other applications as an attachment. FIG. 4f shows the renamed SalesChip/RSE file in the folder at 412.

Figure 5A:
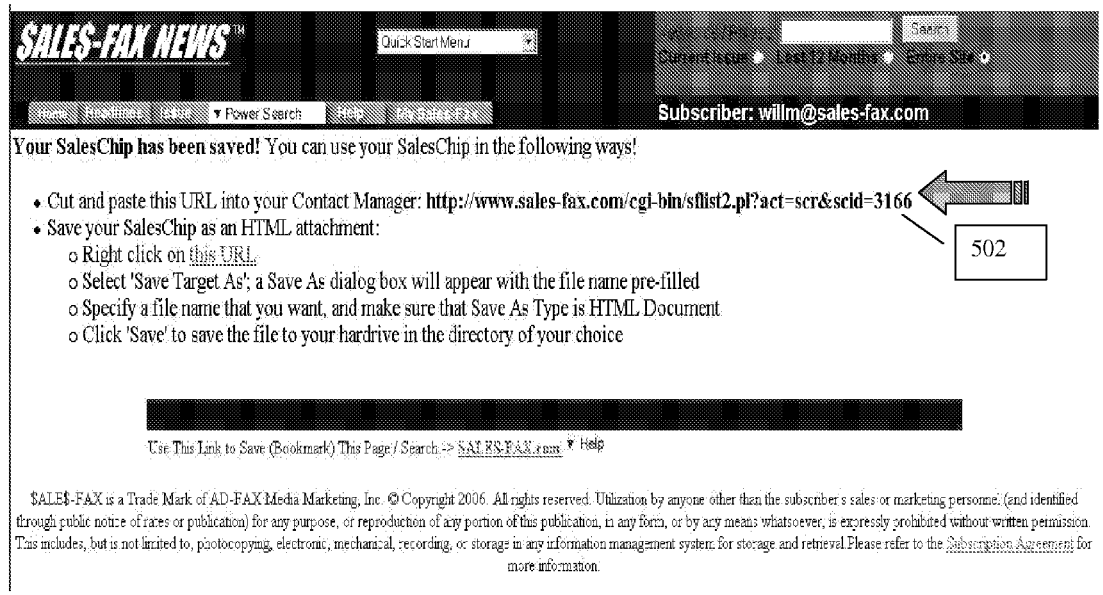
FIG. 5a is a tenth screen shot of the graphical user interface of the subject invention.
Figure 5B:
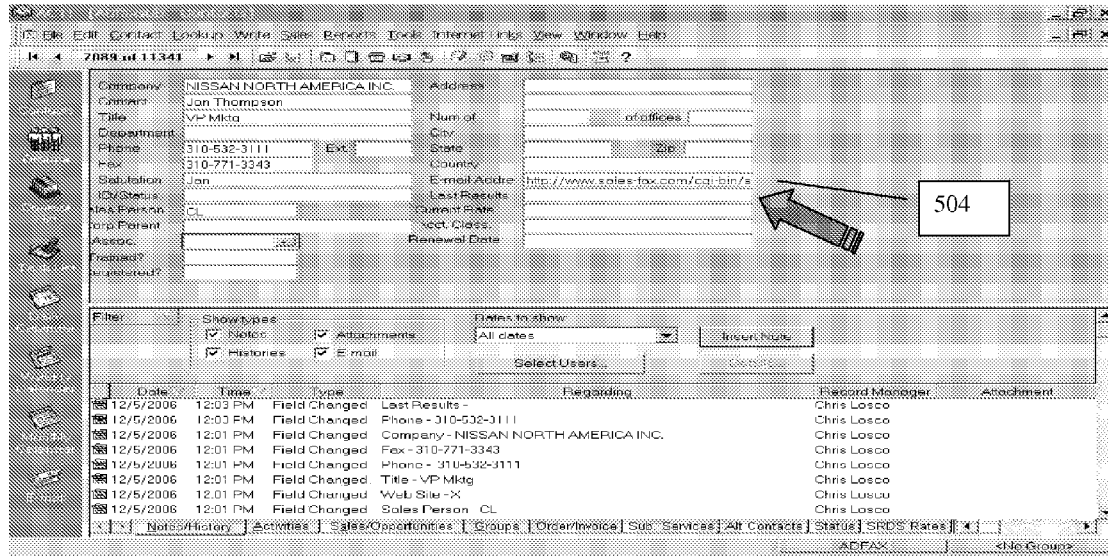
FIG. 5b is a eleventh screen shot of the graphical user interface of the subject invention.

In the current embodiment, software of the subject invention is transportable, via copy and pasting the java script 502 (FIG. 5a) to a web-friendly field 504. FIG. 5b shows the SalesChip/RSE script residing in a web-friendly field in ACT! in a contact manager. Or, the SalesChip/RSE script may be attached as an HTML file to a "Notes History" section of a contact manager or a digital calendar. FIG. 5c shows a SalesChip/RSE HTML file attached to a "Notes History" entry 506 and FIG. 5d shows the process by which a SalesChip/RSE command string is pasted into ACT!'s digital calendar 508.

When either of the above FIG. 4 formats is "clicked," the Handler searches for the unique command string number and sends the command string to a browser to reach a specified URL, where the command string includes instructions for the server that the query may be run as though it had just been entered. When the query is re-run, the latest, or newest, results are registered at the top of the results page. FIG. 6 at 602 shows the result of clicking a SalesChip/RSE command string or HTML file and FIG. 7 shows in this diagram that the dates of entry on the right hand column have sorted the query results in reverse chronological order at 702.

Next referring to FIG. 8, the logic process 800 of the subject invention is shown. At 802 the user enters the desired search criteria. At 804 the search criteria of 802 is processed against indexed data. At 806 the results of the processing of step 804 are displayed. At 808, the process 800 loops back to 802 whereby refinement of the search criteria can be implemented. At 810 the search is saved using the search command-string code of the subject invention. At 814 a unique Identification is assigned to the saved search and is stored. At 812 content publishers can request by automated protocol the unique Identification and search criteria of 814. At 816 various display options are provided to the user to access the unique Identification and the search results. At 818, the unique Identification and related search are enabled based on the selection of the display options presented at 816.

Figure 9:
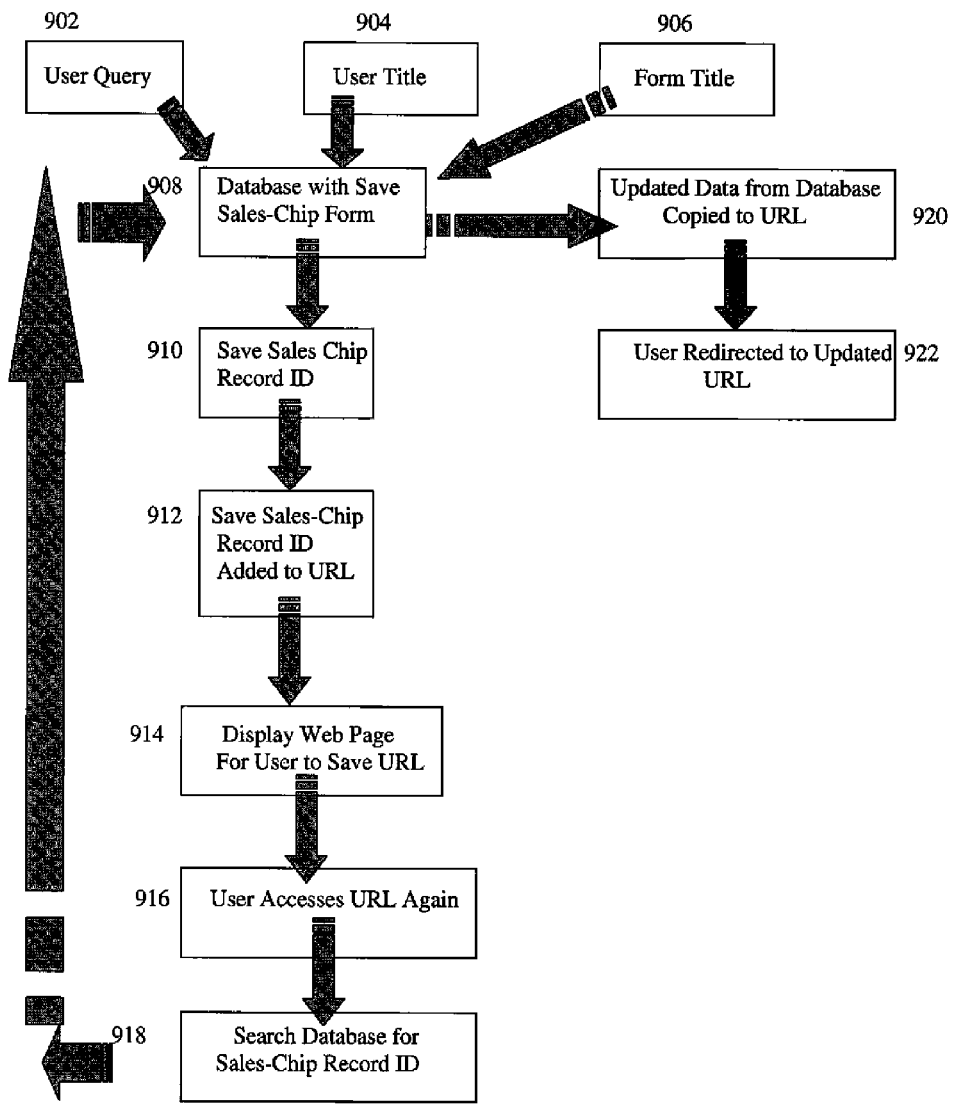
FIG. 9 is a flow chart of the software logic of the subject invention.

Next referring to FIG. 9, the software logic flowchart 900 of the search command-string code ("SalesChip,/RSE" herein) is shown. User query 902, user title 904, and Form title 906 populate and save the SalesChip/RSE form within database 908. From the saved SalesChip/RSE data in database 908 a unique record Identifier is created and saved at 910. At 912 the saved unique record Identifier of 910 is added to a URL. At 914 the web page is displayed for the user to save the URL of 912. At 916 the user, at a later time, accesses the saved URL of 914. At 918, in response to the user again accessing the URL at 916, the database is again searched (looping back to 908) for the SalesChip/RSE unique record Identifier. At 920 the updated data in database 908 from the 918 loop back is again copied to a URL. At 922, the user is redirected to the updated URL of 920.

Although the invention has been shown and described with respect to a best mode embodiment thereof, it should be understood by those skilled in the art that various changes, omissions, and additions may be made to the form and detail of the disclosed embodiment without departing from the spirit and scope of the invention, as recited in the following claims.

For example, another possible implementation includes representing an Identifier as an SMS ID on a mobile phone platform; the SMS ID would be keyed in on a mobile phone and submitted over the cellular network to a handler application which would return a search result set in a compatible format. The result set could be anything based on the search the user previously composed, such as a list of movies playing in the user's neighborhood or sports scores for New York teams. This is but one example of one possible use of the present invention.

What is claimed is:

1. A computer implemented method for personalized and repeatable search requests on a proprietary database wherein said personalized search requests are repeated to access and retrieve newly added information from the proprietary database with repeated requests being implemented with a minimum number of required steps by a search request user, the method comprising the steps of:

entering a user defined search request into the proprietary database frequently updated with newly added information to retrieve information responsive to the search request;

displaying to the user the retrieved information and permitting the user to save the user defined search request if the user determines the retrieved information to be satisfactory;

adding a unique alphanumeric character sequence to the saved user defined search request, said unique alphanumeric character sequence specifically identifying the search request entered by the user for retrieving satisfactory information;

making available to the user the saved user defined search request along with the unique alphanumeric character sequence in a format that is accessible in a web-friendly environment; and forwarding to a handler the saved user defined search request, along with the unique alphanumeric character sequence, whereby the handler searches for the unique alphanumeric character sequence and automatically repeats the search defined by the saved user defined search request to retrieve from the proprietary database information responsive to the user defined search request, including all responsive information added to the proprietary database subsequent to a prior search instituted by the user utilizing the same user defined search request, each search being performed by a search engine located at the proprietary database;

wherein said search request user's minimum number of required steps includes: (1) saving said user defined search request which retrieved satisfactory information and (2) forwarding to the handler the saved user defined search request along with the unique alphanumeric character sequence;

said proprietary database limited to the database which is updated periodically by the database host to add new information of interest for users; and wherein retrieved information responsive to the user's search request is not saved with only the user defined search request which retrieved information satisfactory to the user being saved along with said unique alphanumeric character sequence.

* * * * *